US010151470B2

(12) United States Patent
Ghasabi

(10) Patent No.: US 10,151,470 B2
(45) Date of Patent: Dec. 11, 2018

(54) SLIM RECESSED LIGHT FIXTURE

(71) Applicant: LUMINIZ INC., Etobicoke (CA)

(72) Inventor: Amir Ghasabi, Etobicoke (CA)

(73) Assignee: LUMINIZ INC., Etobicoke (CA)

( * ) Notice: Subject to any disclaimer, the term of this patent is extended or adjusted under 35 U.S.C. 154(b) by 2 days.

(21) Appl. No.: 15/049,771

(22) Filed: Feb. 22, 2016

(65) Prior Publication Data

US 2016/0245498 A1 Aug. 25, 2016

Related U.S. Application Data

(60) Provisional application No. 62/120,180, filed on Feb. 24, 2015.

(30) Foreign Application Priority Data

Mar. 31, 2015 (CA) .................................... 2886730

(51) Int. Cl.

| | |
|---|---|
| ***B60Q 1/06*** | (2006.01) |
| ***F21V 29/76*** | (2015.01) |
| ***F21V 29/503*** | (2015.01) |
| ***F21S 8/02*** | (2006.01) |
| ***F21V 15/01*** | (2006.01) |
| ***F21V 23/00*** | (2015.01) |
| ***F21V 29/508*** | (2015.01) |
| *F21Y 115/10* | (2016.01) |
| *F21Y 103/33* | (2016.01) |

(52) U.S. Cl.

CPC .............. *F21V 29/763* (2015.01); *F21S 8/02* (2013.01); *F21V 15/01* (2013.01); *F21V 23/009* (2013.01); *F21V 29/503* (2015.01); *F21V 29/508* (2015.01); *F21Y 2103/33* (2016.08); *F21Y 2115/10* (2016.08)

(58) Field of Classification Search

CPC ............... B60Q 1/06; F21V 29/00; F21S 6/00
USPC ......................................... 362/373, 257, 294
See application file for complete search history.

(56) References Cited

U.S. PATENT DOCUMENTS

2009/0310345 A1* 12/2009 Holder ...................... F21K 9/68 362/231
2010/0277907 A1* 11/2010 Phipps .................... F21V 11/16 362/235
2012/0224375 A1* 9/2012 Zaderej ..................... F21K 9/00 362/249.02
2012/0268930 A1* 10/2012 Lu ........................... F21V 5/007 362/235

(Continued)

*Primary Examiner* — Edwyn Labaze

(74) *Attorney, Agent, or Firm* — Bereskin & Parr LLP/S.E.N.C.R.L., s.r.l.; Isis E. Caulder

(57) ABSTRACT

A heat sink for a light emitting diode light fixture is provided. The heat sink comprises a housing for receiving driver electronics for powering one or more light emitting diodes of the light fixture. The housing comprises a cavity facing a direction of light emission. The cavity is shaped to receive the driver electronics when the heat sink is connected to the light fixture. The heat sink also comprises a heat exchanging portion thermally coupled to the housing. The heat exchanging portion is for absorbing heat from at least one of the one or more light emitting diodes and the driver electronics, conducting the heat to extremities of the heat exchanging portion, and dissipating the heat to an environment external to the light fixture.

19 Claims, 14 Drawing Sheets

(56) References Cited

U.S. PATENT DOCUMENTS

| | | | | |
|---|---|---|---|---|
| 2013/0301274 | A1* | 11/2013 | Anderson | F21V 29/505 362/294 |
| 2014/0111990 | A1* | 4/2014 | Schupple | F21V 19/0055 362/244 |
| 2015/0176817 | A1* | 6/2015 | Olsson | F21V 15/01 362/249.02 |
| 2015/0285483 | A1* | 10/2015 | Kjaer | F21V 29/503 362/373 |
| 2015/0362169 | A1* | 12/2015 | Hodrinsky | F21V 29/74 315/112 |
| 2015/0382426 | A1* | 12/2015 | Odnoblyudov | H05B 33/0869 315/151 |

* cited by examiner

SLIM RECESSED LIGHT FIXTURE

CROSS-REFERENCE TO RELATED APPLICATIONS

This application claims priority from U.S. Provisional Patent Application No. 62/120,180, filed on Feb. 24, 2015, which is incorporated herein by reference. This application also claims priority from allowed Canadian Patent Application No. 2,886,730, filed on Mar. 31, 2015, which is also incorporated herein by reference.

FIELD

The present specification relates to slim recessed light fixtures, and in particular to slim recessed light emitting diode light fixtures.

BACKGROUND

Light emitting diode (LED) light fixtures can operate at low power consumption; however they require proper cooling to keep the LEDs within their operating temperature range. In addition, LEDs require input power to be conditioned for optimal operation of the LEDs. When LED light fixtures are designed as recessed lights that need to be installed in ceilings or walls with small clearances, the LEDs' cooling mechanism and power conditioning electronics also become subject to space restrictions. In addition, installation of each LED light fixture requires the time and effort for two separate installation procedures, one of the dedicated-but-separate power conditioning unit for each LED light fixture and a second installation for the light fixture itself.

SUMMARY

According to an implementation of the present specification, there is provided a heat sink for a light emitting diode light fixture. The heat sink comprises a housing configured to receive driver electronics for powering one or more light emitting diodes of the light fixture. The housing comprises a cavity facing a direction of light emission, the cavity shaped to receive the driver electronics when the heat sink is connected to the light fixture. The heat sink also comprises a heat exchanging portion thermally coupled to the housing. The heat exchanging portion is for absorbing heat from at least one of the one or more light emitting diodes and the driver electronics, conducting the heat to extremities of the heat exchanging portion, and dissipating the heat to an environment external to the light fixture.

The cavity can be shaped as a circular puck having a flat face facing the direction of light emission and a cylindrical face cooperating with the flat face to define the cavity.

The housing can be integrally formed with the heat exchanging portion.

The heat exchanging portion can include a base defining a plane about perpendicular to the direction of light emission, and a plurality of fins extending from the base and thermally coupled to the base.

Some fins of the plurality of fins can be directly thermally coupled to the housing and others of the plurality of fins can be only thermally coupled to the housing through the base.

The plurality of fins can be about parallel to one another.

A height of the plurality of fins extending from the base in a direction opposite the direction of light emission can be about equal to a depth of the cavity in the direction opposite the direction of light emission.

The housing and the heat exchanging portion each can include die-cast material.

The housing and the heat exchanging portion each can include aluminum.

According to another implementation of the present specification, there is provided a light fixture comprising a casing, one or more light emitting diodes connected to the casing, driver electronics electrically connected to the one or more light emitting diodes, and a heat sink secured to the casing. The heat sink comprises a housing for receiving the driver electronics for powering the one or more light emitting diodes of the light fixture. The housing comprises a cavity facing a direction of light emission, the cavity shaped to receive the driver electronics. The heat sink also comprises a heat exchanging portion thermally coupled to the housing. The heat exchanging portion is for absorbing heat from at least one of the one or more light emitting diodes and the driver electronics, conducting the heat to extremities of the heat exchanging portion, and dissipating the heat to an environment external to the light fixture. The light fixture also comprises an encapsulant received within the housing. The encapsulant covers at least some portions of the driver electronics.

The housing can be integrally formed with the heat exchanging portion.

The cavity can be shaped as a circular puck having a flat face facing the direction of light emission and a cylindrical face cooperating with the flat face to define the cavity.

The heat exchanging portion can include a base defining a plane about perpendicular to the direction of light emission, and a plurality of fins extending from the base and thermally coupled to the base.

Some fins of the plurality of fins can be directly thermally coupled to the housing and others of the plurality of fins can be only thermally coupled to the housing through the base.

The plurality of fins can be about parallel to one another.

A height of the plurality of fins extending from the base in a direction opposite the direction of light emission can be about equal to a depth of the cavity in the direction opposite the direction of light emission.

The housing and the heat exchanging portion each can include die-cast material.

The housing and the heat exchanging portion each can include aluminum. The driver electronics can be configured to receive 12V input.

The light fixture can further include a wire connector connected to the driver electronics. The wire connector is for connecting the light fixture to a power source external to the light fixture, and the wire connector can comply with predetermined flame and smoke test standards.

The light fixture can further include a plurality of clips secured to the casing. The clips are for securing the light fixture to a substrate.

According to another implementation of the present specification, there is provided a heat sink for a light emitting diode light fixture, the heat sink comprising a housing configured to receive driver electronics for powering one or more light emitting diodes of the light fixture. The housing comprises a cavity comprising three or more hollow lobes, the cavity shaped to receive the driver electronics when the heat sink is connected to the light fixture. The heat sink also comprises an opening in the cavity, the opening configured to allow passage of a wire connector for connecting the driver electronics receivable inside the cavity to a power source external to the light fixture.

The cavity can be shaped as a lobed puck comprising: an end wall having a perimeter defining three or more extensions, the end wall facing a direction of light emission, and one or more side walls cooperating with the end wall to define the cavity. Each of the extensions cooperates with the one or more side walls to define one corresponding lobe.

The perimeter can define four identical extensions oriented radially, each extension being equidistant from its two adjacent extensions.

The opening can be located in one of the one or more side walls.

The end wall can comprise a trench facing opposite the direction of light emission, the trench configured to receive a portion of a length of the wire connector.

The trench can comprise a bottom cooperating with one or more sides to define the trench, and the opening can be located in one of the one or more sides.

The trench can comprise a bottom cooperating with one or more sides to define the trench, and the opening can be located in the bottom.

BRIEF DESCRIPTION OF THE DRAWINGS

Implementations of the present specification will now be described, by way of example only, with reference to the attached Figures.

DETAILED DESCRIPTION

Figure 1:
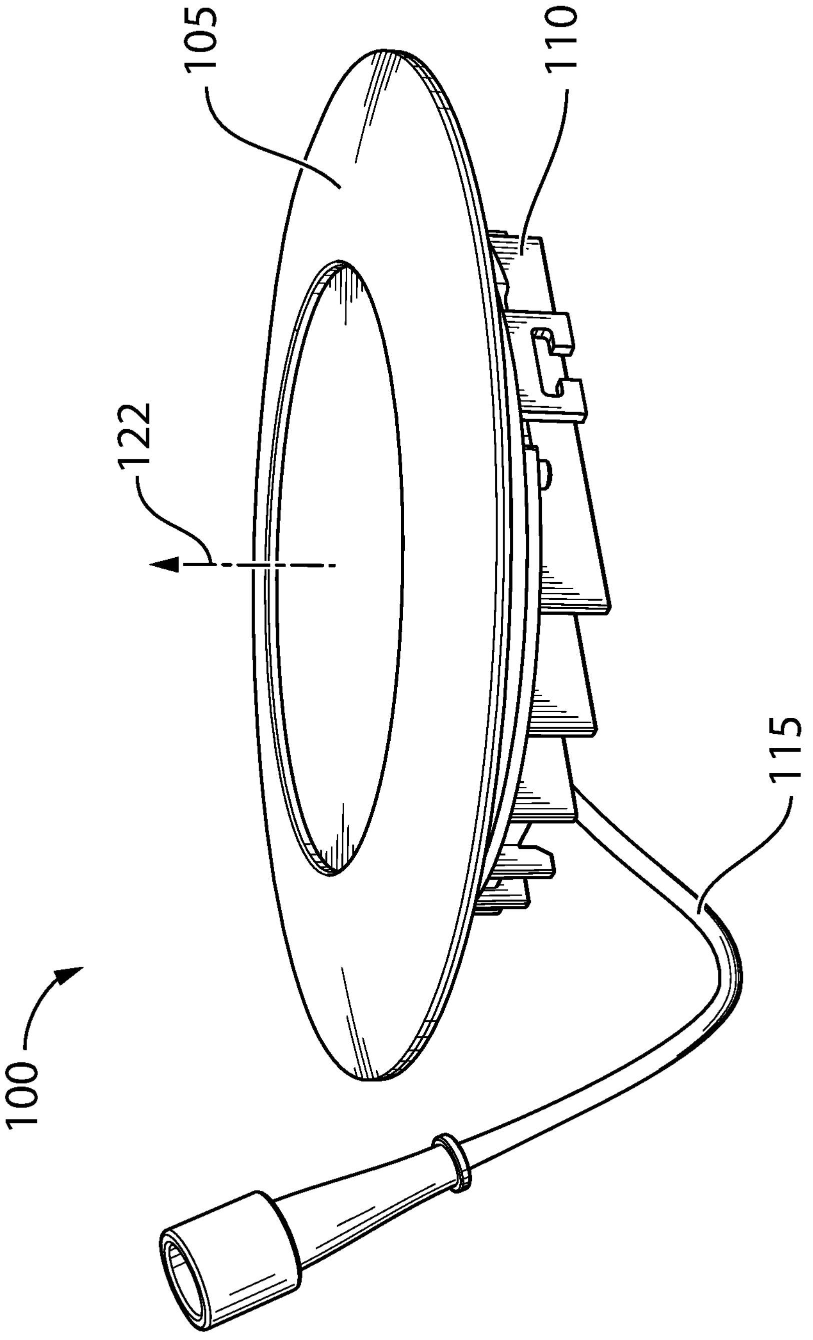
FIG. 1 shows a top perspective view of an example light fixture, according to non-limiting implementations.

FIG. 1 shows a top perspective view of light fixture 100, comprising a casing 105 and a heat sink 110 secured to casing 105. A wire connector 115 connects to light fixture 100 and can connect to a power source external to light fixture 100 to bring power to light fixture 100 from the power source. Wire connector 115 can be a pigtail type connector, or other types of suitable connectors known in the art. Light fixture 100 emits light in the general direction of light emission 122.

Directional terms "top" and "bottom" are for convenience of description only; light fixture 100 can be installed in ceilings, walls, or other substrates with direction of light emission 122 facing any desired direction.

Figure 2:
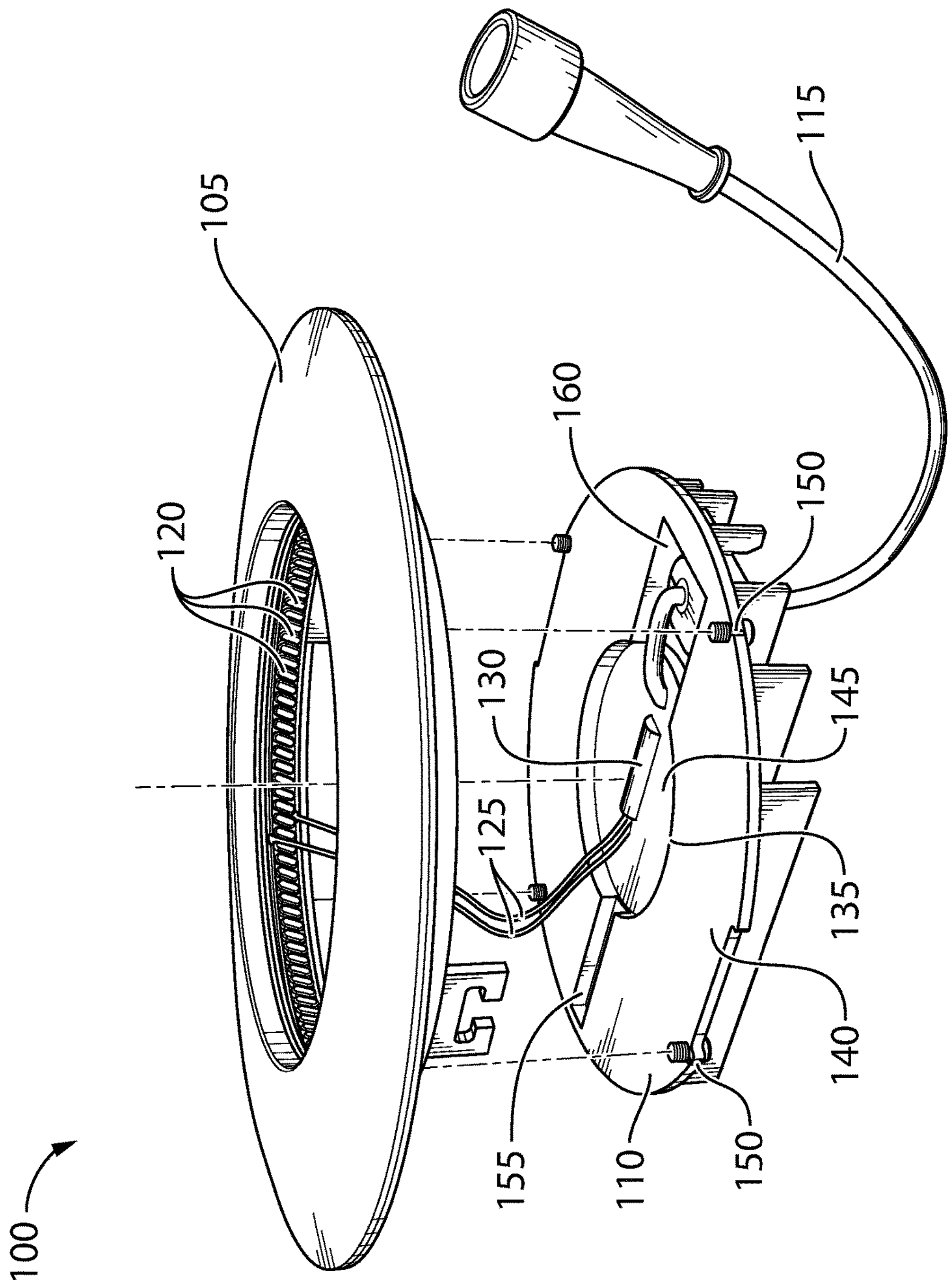
FIG. 2 shows an exploded top perspective view of the light fixture of FIG. 1, with some components of the light fixture omitted from view.
Figure 6:
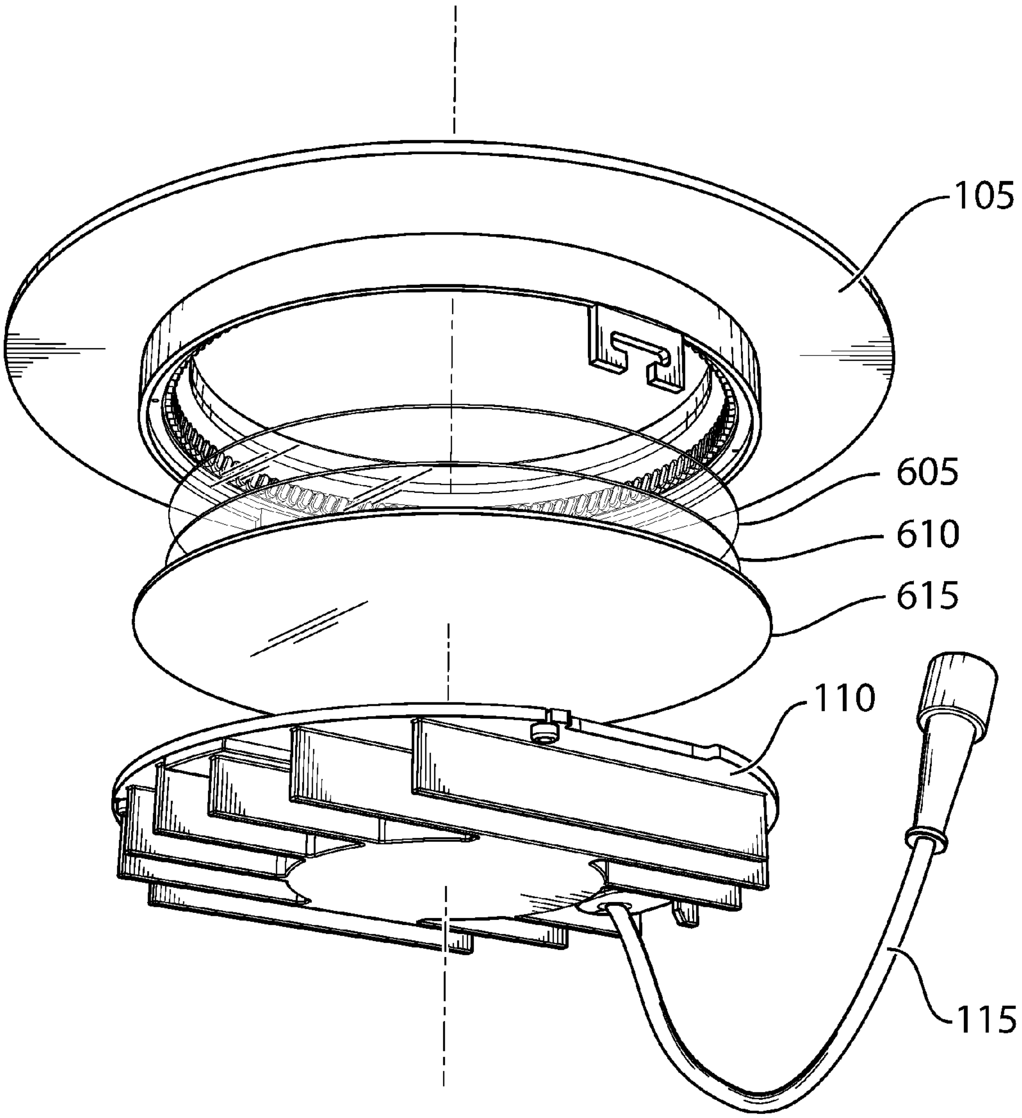
FIG. 6 shows an exploded top perspective view of the components of the light fixture of FIG. 1, including some of the components omitted from view in FIG. 2.

FIG. 2 shows an exploded top perspective view of light fixture 100, showing casing 105, heat sink 110, and wire connector 115. FIG. 2 omits some components of light fixture 100 from view for the sake of clarity; some of these omitted components are shown in FIG. 6 and described below. Light emitting diodes (LEDs) 120 are connected to casing 105, and are used to generate the light emitted by light fixture 100. One or more LEDs can be used to generate light in light fixture 100. In FIG. 2 LEDs 120 are shown as arranged circumferentially on an inside surface of casing 105; however, other suitable arrangements of LEDs 120 on or inside casing 105 are also contemplated.

Wires 125 connect LEDs 120 to driver electronics 130, which are in turn connected to wire connector 115. LEDs 120 can be connected in series to each other, and then connected to driver electronics 130. Alternatively, LEDs 120 can be connected in parallel with each one of or subset of LEDs connected individually to driver electronics 130. Driver electronics 130 receive input power from wire connector 115 and condition the input power for powering LEDs 120. This conditioning can include, but is not limited to, changing the voltage, current, or phase of the input power and/or converting the input power between alternating current and direct current. In some implementations, driver electronics 130 are configured to receive 12V input power, which can comprise direct current or alternating current.

Heat sink 110 can comprise a housing 135 coupled to a heat exchanging portion 140. Housing 135 can be thermally coupled to heat exchanging portion 140. Housing 135 is shaped to receive driver electronics 130 when heat sink 110 is connected to casing 105 of light fixture 100. Heat exchanging portion 140 is configured for absorbing heat from at least one of LEDs 120 and driver electronics 130. Heat transfer from LEDs 120 and/or driver electronics 130 can be via mechanisms including, but not limited to, conduction and convection. Heat exchanging portion 140 then conducts the heat to its extremities, from where the heat is dissipated to an environment external to light fixture 100. Heat dissipation can be via mechanisms including, but not limited to, convection, conduction, and radiative heat dissipation. The environment external to light fixture 100 can include, but is not limited to, the substrate that light fixture 100 is installed in, such as a wall or ceiling, and air.

Electronics such as LEDs 120 and driver electronics 130 generate heat as they operate; however, they can have a narrow operating temperature range, outside of which they become prone to malfunction. Heat sink 110 in general, and heat exchanging portion 140 in particular, dissipate the heat generated by LEDs 120 and driver electronics 130, and maintain LEDs 120 and driver electronics 130 in their operating temperature range.

Driver electronics 130 can be secured in housing 135 using an encapsulant 145. Encapsulant 145 can cover all or only some portions of driver electronics 130. Encapsulant 145 can be a polymer, a resin, or any other suitable material. Encapsulant 145, in addition to securing driver electronics 130 in housing 135, can also protect driver electronics 130 from moisture, dust, and other environmental elements that may harm driver electronics 130. In some implementations, encapsulant 145 can be thermally conductive to facilitate heat transfer from driver electronics 130 to heat sink 110, thereby facilitating cooling of driver electronics 130. In some implementations, not shown, driver electronics 130 can be secured in housing 135 using a suitable fastener or adhesive, instead of or in addition to encapsulant 145.

Heat sink 110 can have an outgoing wire cavity 155 shaped and sized to receive wires 125 connecting LEDs 120 to driver electronics 130. Outgoing wire cavity 155 can be defined in heat exchanging portion 140, or in other implementations (not shown) as part of housing 135. Heat sink 110 can also have an incoming wire cavity 160 shaped and sized to receive the end portion of wire connector 115 that leads to driver electronics 130. Heat sink 110 can be secured to casing 105 using fasteners, including but not limited to screws threaded through screw holes 150 in heat sink 110.

Figure 3:
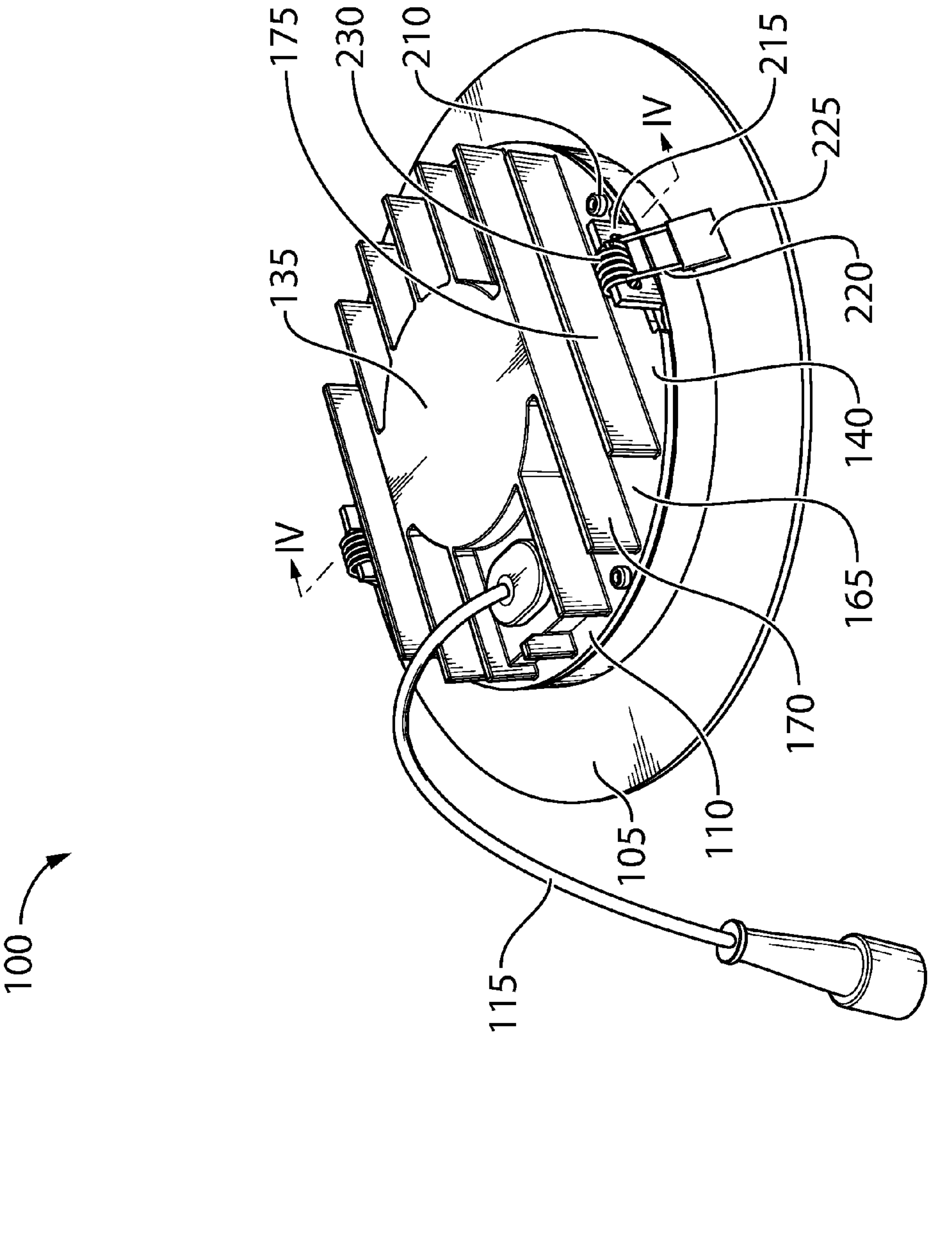
FIG. 3 shows a bottom perspective view of the light fixture of FIG. 1.
Figure 4:
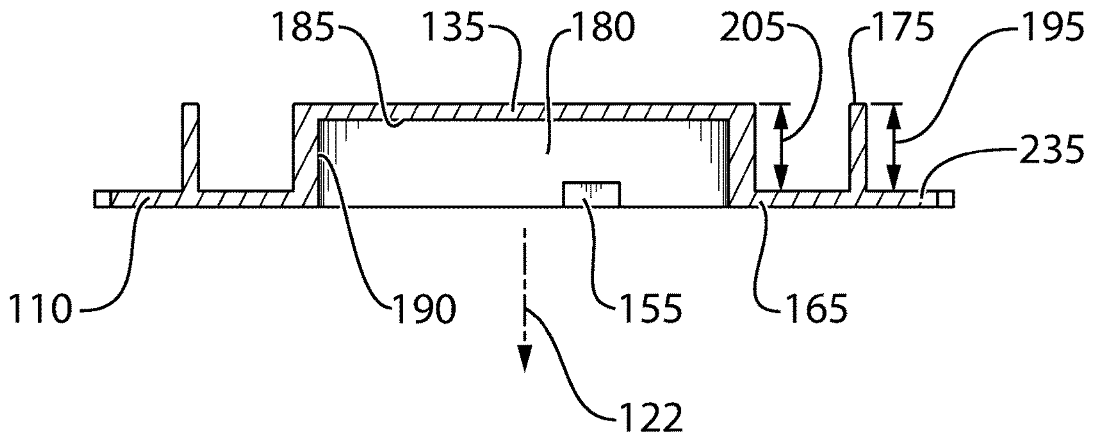
FIG. 4 shows a side elevation cross-section of the heat sink of the light fixture shown in FIG. 3, along line Iv-Iv.

FIG. 3 shows a bottom perspective view of light fixture 100, showing heat sink 110 secured to casing 105, and showing wire connector 115. Housing 135 and heat exchanging portion 140 can be integrally formed. As shown in FIG. 4, which is a side elevation cross-section of heat sink 110 shown in FIG. 3 along line Iv-Iv, housing 135 can comprise a cavity 180 facing in the direction of light emission 122. Cavity 180 can be shaped and sized to receive driver electronics 130.

In this implementation, cavity 180 is shaped as a circular puck having a flat face 185 facing the direction of light emission 122 and a cylindrical face 190 cooperating with flat face 185 to define cavity 180. In other implementations, not shown, cavity 180 can be any other shape suitable for receiving driver electronics 130. In some implementations, not shown, heat sink 110 can have a plurality of separate cavities for receiving different components of the electronics.

As shown in FIGS. 3 and 4, heat exchanging portion 140 can comprise a base 165 defining a plane 235 about perpendicular to the direction of light emission 122. Plane 235 can be flat, or it can be curved. For example, plane 235 can be concave or convex to suit the design of light fixture 100. A plurality of fins 170,175 can extend from base 165 and can be thermally coupled to base 165. Fins 170,175 increase the surface area of heat sink 110 generally, and heat exchanging portion 140 in particular, and facilitate dissipation of the heat absorbed by heat sink 110 into the environment external to light fixture 100. Fins 170,175 can be integrally formed with base 165. In some implementations, not shown, fins also cover housing 135.

Figure 5:
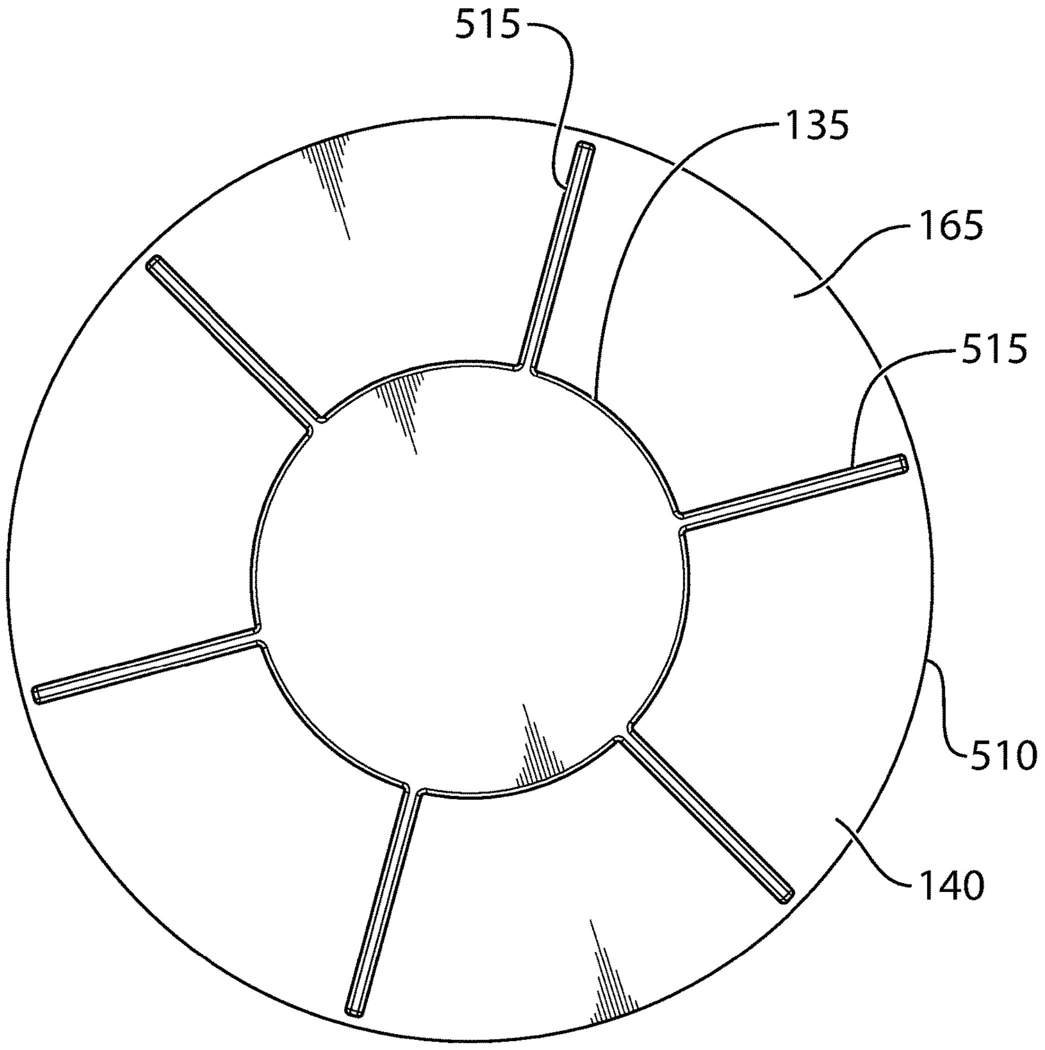
FIG. 5 shows a bottom plan view of another example heat sink for a light fixture, according to non-limiting implementations.

Fins 170,175 can be about parallel to each other. In other implementations, for example heat sink 510 shown in FIG. 5, fins 515 can be arranged radially as spokes of a wheel, with housing 135 forming the hub of the wheel. Heat sink 510 has a heat exchanging portion 140, which in turn comprises fins 515 extending from base 165. The fins can also be arranged in any other suitable geometry.

As shown in FIGS. 3 and 4, some of the fins, such as fin 170 are directly thermally coupled to the housing 135, e.g. by being directly connected to housing 135 for the purpose of thermal conduction, while other fins, such as fin 175, are only thermally coupled to housing 135 through base 165. In other implementations, such as the one shown in FIG. 5, all fins 515 are directly thermally coupled to housing 135, i.e. heat is directly conducted from housing 135 to each fin 515.

As shown in FIGS. 3 and 4, a height 195 of fins 170,175 measured from base 165 in a direction opposite to the direction of light emission 122 can be about equal to a depth 205 of cavity 180 of housing 135 measured from base 165 also in the direction opposite to the direction of light emission 122. In some implementations, height 195 can be within about ±10% of depth 205. In other implementations, not shown, height 195 can be outside about ±10% of depth 205. As light fixtures 100 are contemplated to be installed in substrates with limited clearance for receiving the heat sink 110 and/or driver electronics 130, reducing the height 195 and/or depth 205 can facilitate light fixture 100 fitting in its substrate. Having height 195 about equal to depth 205 can also facilitate the ability of light fixture 100 to fit in substrates with small clearances.

Height 195 can impact the effective surface area of fin 175 available for dissipating heat. Depth 205 can impact the volume available to house driver electronics 130. In some implementations, the minimum for height 195 and depth 205 is about 1 inch (2.54 cm). In other implementations, height 195 and depth 205 can each be larger or smaller than 1 inch (2.54 cm). Larger diameter lights can require a larger number of LEDs 120, which in turn requires more heat dissipation and can also require more voluminous driver electronics 130.

In some implementations, driver electronics 130 can receive 120V input power, which can comprise, but is not limited to, alternating current. In other implementations the input power can have a different voltage. Depending on the input power, driver electronics 130 can have a different volume, and can require a different size housing 135. In some implementations, a 4 inch (10.16 cm) (diameter) light fixture 100 with driver electronics 130 receiving 120V input power can have a maximum height 195 and/or depth 205 of about 1.5 inches (3.81 cm). In other implementations, a 6 inch (15.24 cm) (diameter) light fixture 100 with driver electronics 130 receiving 120V input power can have a maximum height 195 and/or depth 205 of about 2 inches (5.08 cm). In yet other implementations, a 4 inch (10.16 cm) (diameter) light fixture 100 with driver electronics 130 receiving 12V input power can have a maximum height 195 and/or depth 205 of about 1 inch (2.54 cm).

As shown in FIG. 3, casing 105 can have one or more connected clip supports 215. Clip supports 215 can also be integrally formed with casing 105. Clip supports 215 each support a clip 220. Clip 220 can be biased by spring 230 and portions of clip 220 can be covered by a clip cover 225. In some implementations, clip cover 225 can comprise an envelope shaped and sized to receive portions of clip 220. Clip cover 225 can comprise a plastic, an elastomer, or other suitable materials. Clips 220 can be used to secure light fixture 100 in the substrate, such as a wall or ceiling, where light fixture 100 is to be installed. Screws 210 can be used to secure heat sink 110 to casing 105.

In this implementation, housing 135 and heat exchanging portion 140 of heat sink 110 include die-cast material. Housing 135 and heat exchanging portion 140 of heat sink 110 can be made of aluminum and can be die cast. In some implementations, wire connector 115 complies with predetermined flame and smoke test standards. For example, wire connector 115 can comply with the FT6 Horizontal Flame and Smoke Test. Wire connector 115 can comply with horizontal flame and smoke test standards whereby flame spread cannot not exceed 1.50 meters and smoke density shall be 0.5 at peak optical density and 0.15 at maximum average optical density.

FIG. 6 shows an exploded top perspective view of light fixture 100, showing also some of the components that were not shown in FIG. 2. In addition to casing 105, heat sink 110, and wire connector 115, FIG. 6 shows outer plate 605, diffuser plate 610, and cover 615. Outer plate 605 and diffuser plate 610 are dimensioned to be received inside casing 105. Outer plate 605 protects the inner workings of light fixture 100 from external impacts and from dust and the elements. Color and opacity of outer plate 605 can determine the color and brightness of the light emitted by light fixture 100. Outer plate 605 can also be patterned to allow light fixture 100 to emit light in that pattern.

Diffuser plate 610 receives light emitted by LEDs 120 and can diffuse and mix the light to produce a more uniform light, which is then emitted through outer plate 605. Diffuser plate 610 can be a disk-shaped light guide and can diffuse and mix the LEDs' 120 light through multiple internal reflections. Diffuser plate 610 can also have one or more regions of varying opacity to further diffuse and mix the LEDs' 120 light. Diffuser plate 610 can have an array of regions of varying opacity.

Cover 615 can be attached to heat sink 110 using an adhesive, including but not limited to glue and tape. Cover 615 can cover cavity 180, driver electronics 130, outgoing wire cavity 155, and incoming wire cavity 160. Cover 615 can be a reflective sheet or a sheet of colored material. By covering the features and color of heat sink 110 and driver electronics 130, cover 615 provides a physically uniform surface of uniform color for directing any reflected light from LEDs 120 towards diffuser plate 610 and outer plate 605.

Figure 7:
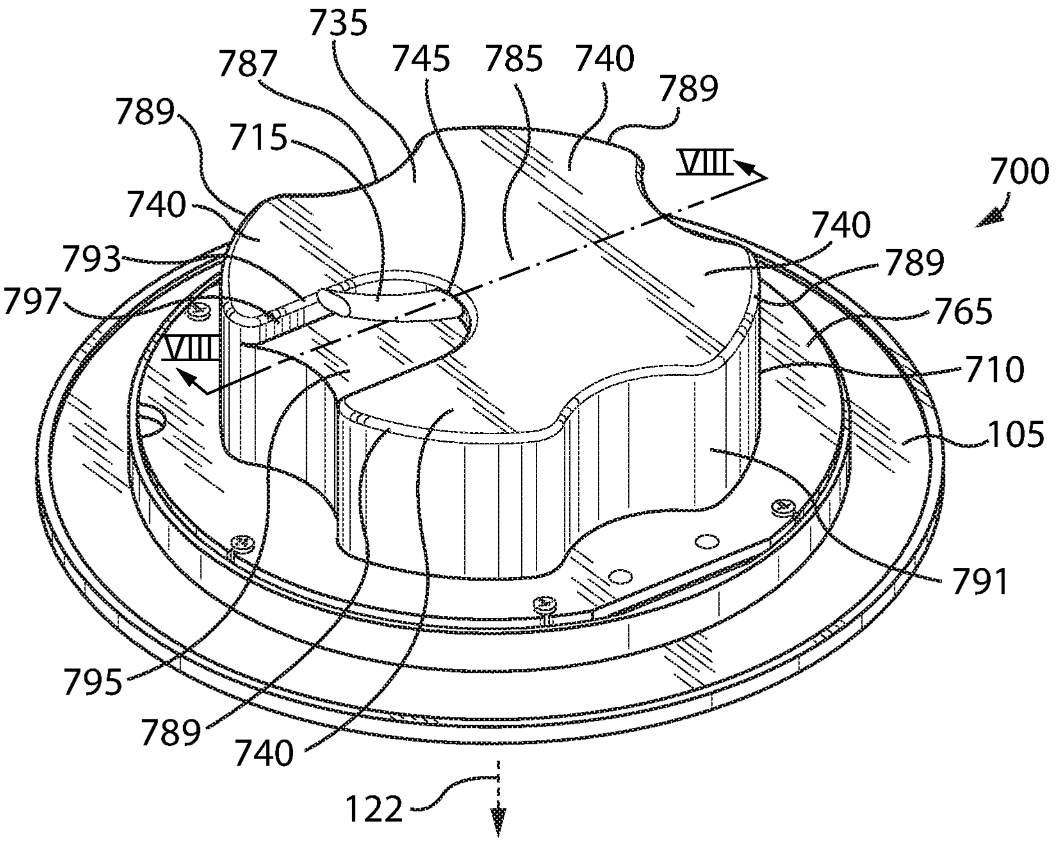
FIG. 7 shows a top perspective view of another implementation of the light fixture, according to non-limiting implementations.

FIG. 7 shows a top perspective view of a light fixture 700, which comprises a heat sink 710 secured to casing 105. Light fixture 700 can be substantially similar to light fixture 100 and can comprise components substantially similar to those of light fixture 100, with the main difference being that heat sink 710 is different than heat sinks 110 and 510.

Heat sink 710 comprises a housing 735 configured to receive driver electronics 130 for powering LEDs 120 (not visible in FIG. 7, but shown for example in FIG. 2). Heat sink 710 also comprises a base 765 secured to housing 735. Base 765 can be used to secure heat sink 710 to casing 105. It is contemplated that in some implementations heat sink 710 can have no base, and housing 735 can be secured directly to casing 105.

Housing 735 comprises a cavity (not visible in FIG. 7) shaped and/or sized to receive driver electronics 130 when heat sink 710 is secured to casing 105 to form light fixture 700. The cavity comprises two or more lobes 740. Lobes 740 can be hollow. Lobes 740 can comprise corresponding partial enclosures that remain connected to one another to preserve the space inside the cavity as a contiguous space. In some implementations, the cavity can comprise three or more lobes 740.

As depicted in FIG. 7, the cavity can be shaped as a lobed puck comprising an end wall 785 facing the direction of light emission 122, which end wall 785 cooperates with a side wall 791 to define the cavity. End wall 785 can comprise at least a portion that is flat. End wall 785 comprises a perimeter 787, which in turn can comprise two or more extensions 789. In some implementations, the perimeter can comprise three or more extensions. Each of extensions 789 cooperates with side wall 791 to define a corresponding lobe 740. While FIG. 7 shows one continuous, curved side wall 791, it is contemplated that the cavity can comprise multiple curved walls joined at vertexes and/or along edges, multiple flat walls joined at vertexes and/or along edges, or a combination of one or more curved walls and one or more flat walls joined at vertexes and/or along edges.

In light fixture 700, lobes 740 are shown as having walls that curve in two dimensions, i.e. the curved side wall 791. It is contemplated that in other implementations the lobes can comprise walls that curve in three dimensions, or alternatively comprise walls that are all flat.

In some implementations, extensions 789 can comprise one or more vertexes. In other implementations, extensions 789 can comprise no vertexes. In some implementations extensions 789 can each comprise a convex curve. In addition and/or instead, the portions of perimeter 787 other than extensions 789 can comprise concave curves. In other implementations, not shown, extensions 789 can each comprise a convex curve and the portions of perimeter 787 other than extensions 789 can comprise fissures or vertexes. In yet other implementations, perimeter 787 can be shaped as a cross or a '+' sign, with each arm of the cross and/or '+' sign defining one extension 789. In yet other implementations, perimeter 787 can be shaped as a cross or a '+' sign with rounded corners and/or curved edges.

In some implementations, not shown, the lobes can each comprise a convex curved surface. In addition and/or instead, the portions of the cavity other than lobes 740 can comprise concave curved surfaces. In yet other implementations, not shown, lobes 740 can each comprise a convex curved surface and the portions of the cavity other than lobes 740 can comprise fissures or vertexes.

As shown in FIG. 7, the cavity of housing 735 can comprise four identical or substantially identical lobes 740 oriented radially, with each lobe 740 being about equidistant from its two adjacent lobes 740. In other words, perimeter 787 can define four identical or substantially identical extensions 789 oriented radially, with each extension being equidistant from its two adjacent extensions 789. These four radial extensions 789 cooperate with side wall 791 to define four radial lobes 740.

While FIG. 7 shows extensions 789 as being substantially the same and lobes 740 as being substantially the same, it is contemplated that extensions 789 can be different from one another and/or lobes 740 can be different than one another.

Lobes 740 can provide a balance between providing a sufficient surface area for heat dissipation, while also preserving space inside the cavity that is large enough to be useful for receiving driver and other electronics. Compared to solid and/or filled heat dissipation structures, hollow lobes 740 can require less material and can represent less intricate, simpler, and cheaper manufacturing. In addition, hollow lobes 740 can also provide space inside the cavity of housing 735 to receive driver electronics 130 without requiring the cavity to be very deep in the direction opposite the direction of light emission 122.

Heat sink 710 also comprises an opening 745 in the cavity. Opening 745 is configured to allow passage of a wire connector 715 for electrically connecting driver electronics 130 received inside the cavity to a power source external to light fixture 700.

End wall 785 of the cavity can comprise a trench 793 facing opposite the direction of light emission 122. Trench 793 can be configured to receive a portion of the length of wire connector 715. Trench 793 can be deep enough to receive the full thickness of wire connector 715.

Trench 793 can comprise a bottom 795 cooperating with one or more sides 797 to define trench 793. Opening 745 can be located in one of the sides 797. This positioning of opening 745, in cooperation with trench 793, can allow wire connector 715 to emerge from the cavity, through opening 745, and in a direction about perpendicular to the direction of light emission 122. This, in turn, can obviate the need for added depth and/or clearance in the direction opposite the direction of light emission 122 that could otherwise be necessary for wire connector 715 to exit and/or emerge from the cavity of housing 735 without excessive bending. As a result, light fixture 700, including its heat sink 710, can require less space and/or clearance when being installed in a ceiling, wall, or other substrate.

Figure 8:
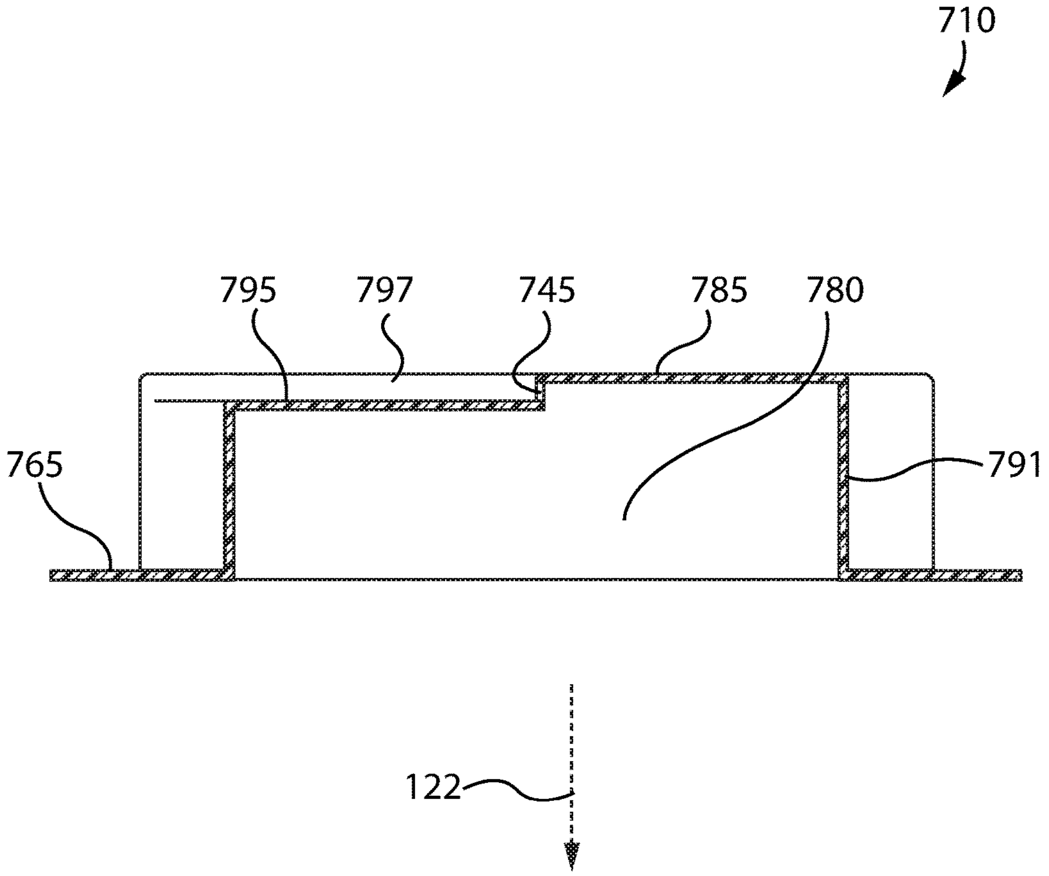
FIG. 8 shows a cross section of a heat sink of the light fixture of FIG. 7 along line VIII-VIII shown in FIG. 7, according to non-limiting implementations.

In other implementations, not shown, trench 793 can comprise only one or more sides 797 and no bottom. Trench 793 can comprise a V-shaped or U-shaped groove, among other suitable shapes FIG. 8 shows a cross-section of heat sink 710 along line VIII-VIII shown in FIG. 7. FIG. 8 shows end wall 785 cooperating with side wall 791 to define cavity 780. Bottom 795 and side 797 of the trench are also shown. In addition, FIG. 8 shows opening 745 leading from inside of cavity 780 onto the trench. A cross-section of base 765 is also depicted.

While FIG. 8 shows cavity 780 as being open in the direction of light emission 122, it is contemplated that in some implementations cavity 780 can comprise a further end wall opposite end wall 785, the further end wall configured to enclose cavity 780. In such implementations, the further end wall can comprise one or more openings for electrically connecting driver electronics 130 inside cavity 780 to LEDs 120.

Figure 9:
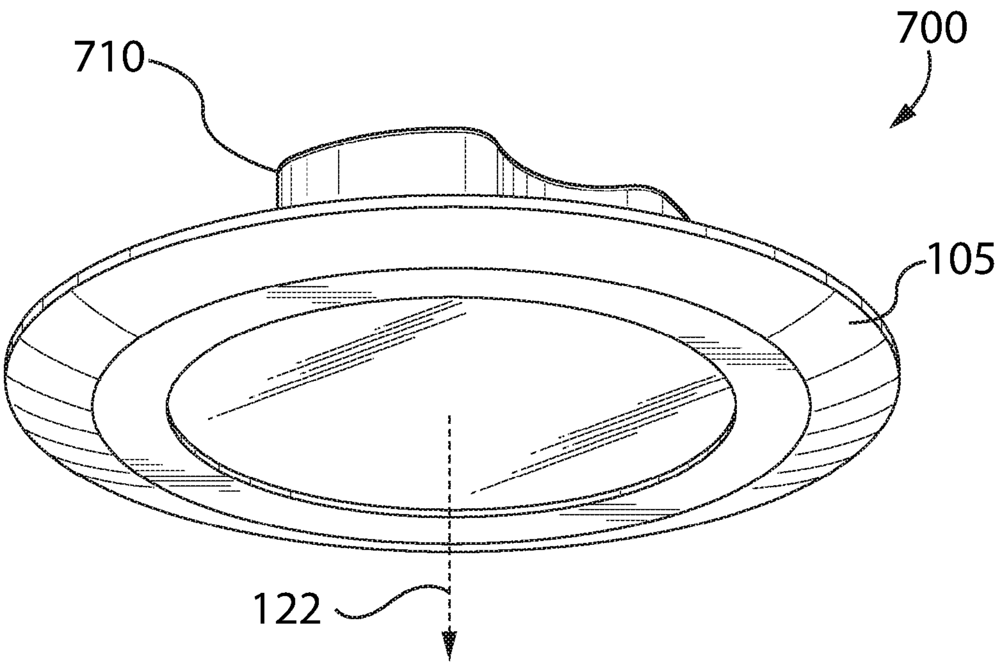
FIG. 9 shows a bottom perspective view of the light fixture of FIG. 7.

FIG. 9 shows a bottom perspective view of light fixture 700 comprising casing 105 secured to heat sink 710, and configured to emit light in the direction of light emission 122.

Figure 10:
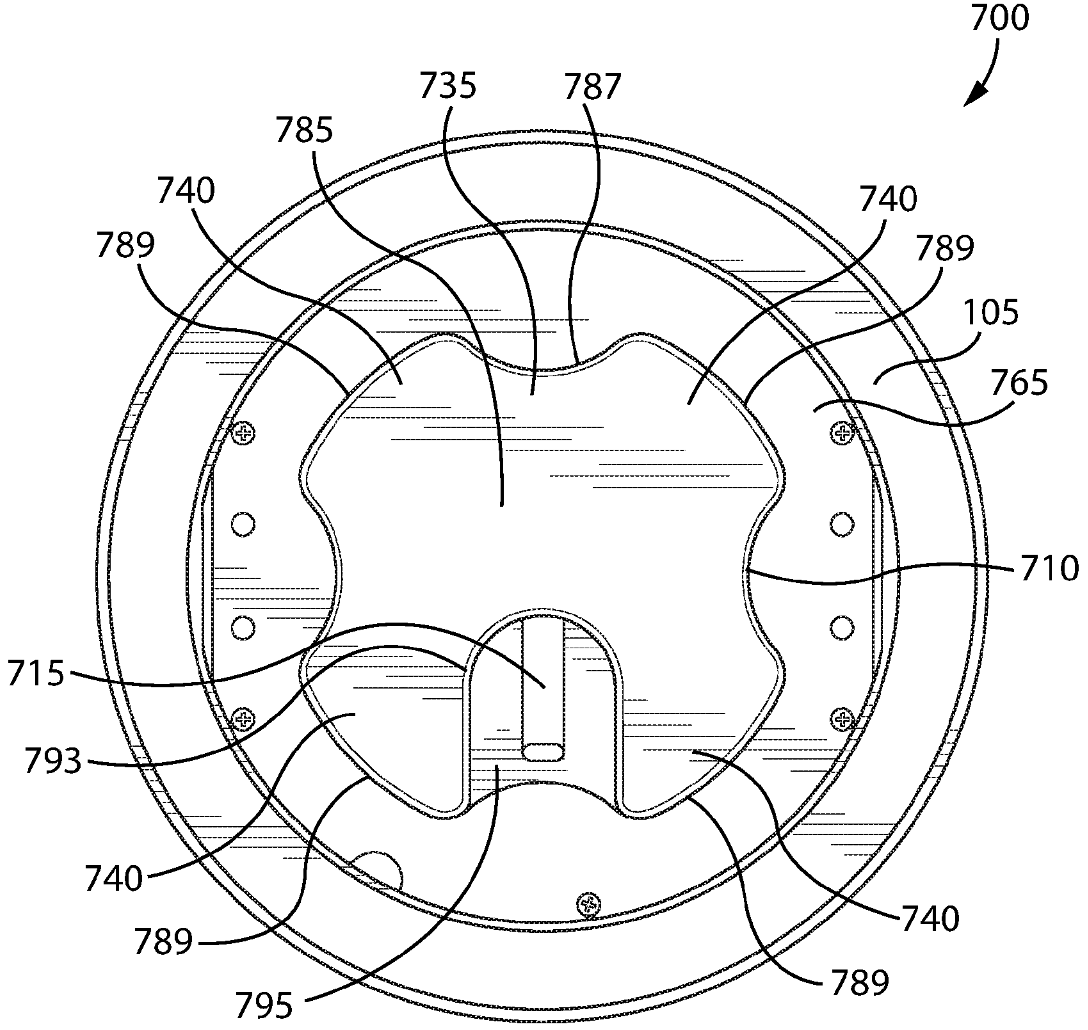
FIG. 10 shows a top plan view of the light fixture of FIG. 7.

FIG. 10 shows a top plan view of light fixture 700 comprising casing 105 secured to heat sink 710. Heat sink 710, in turn, comprises housing 735 and optionally base 765 connected to housing 735. Housing 735 comprises a cavity (not visible in FIG. 10) having lobes 740. Heat sink 710 also comprises an opening (not visible in FIG. 10) configured to allow passage of wire connector 715 from inside the cavity to outside the cavity to connect the driver electronics to a power source external to light fixture 700.

The cavity can comprise end wall 785 having perimeter 787, which in turn defines extensions 789. The side wall (not visible in FIG. 10) cooperates with end wall 785 to define the cavity, where each of extensions 789 cooperates with the side wall to define a corresponding lobe 740.

End wall 785 can comprise trench 793 configured to receive a portion of the length of wire connector 715. Trench 793 can comprise bottom 795 cooperating with a side (not visible in FIG. 10) to define trench 793. Opening 745 is located in the side of trench 793. While in light fixture 700 opening 745 is shown as being located in the side of trench 793, it is contemplated that in other implementations, opening 745 can be partially in the side and partially in bottom 795 of trench 793. In other words, in some implementations opening 745 can span both the side and bottom 795 of trench 793. It is also contemplated that the cavity can have multiple openings located in one or more of the side and/or bottom 795 of trench 793.

In some implementations, not shown, end wall 785 can be removable from side wall 791, and can be securable to side wall 791 using suitable fasteners including, but not limited to, one or more screws.

Figure 11:
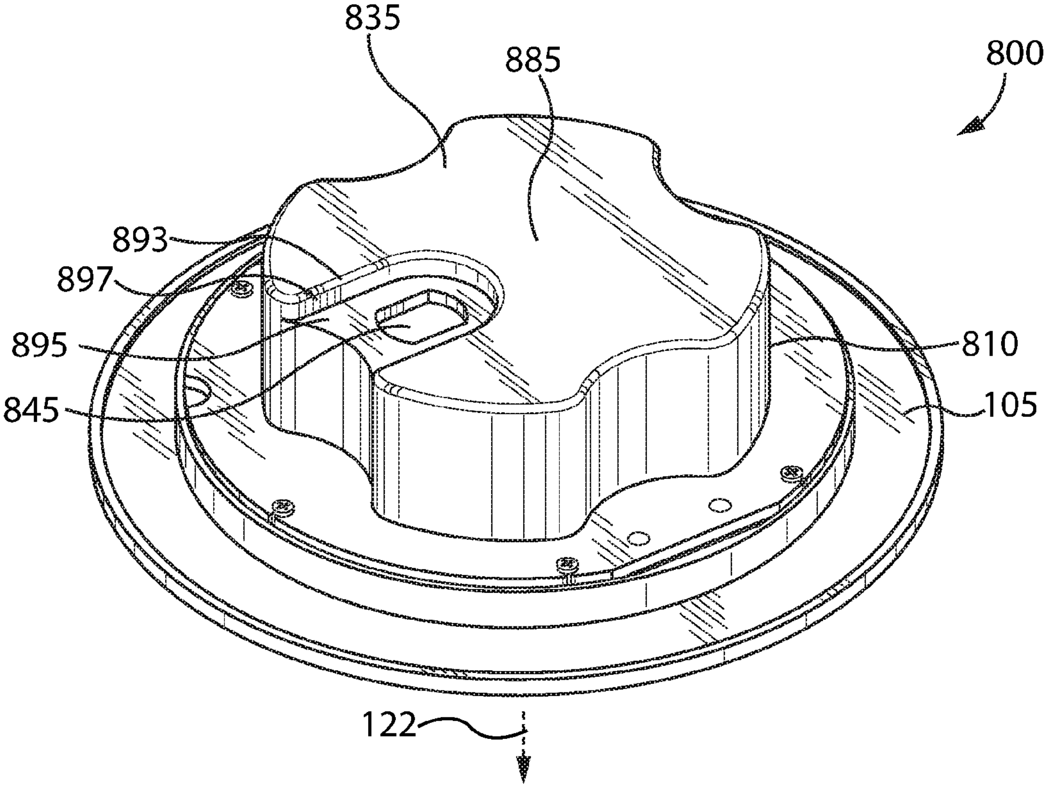
FIG. 11 shows a top perspective view of yet another implementation of the light fixture, according to non-limiting implementations.

FIG. 11 shows a top perspective view of light fixture 800, which is similar to light fixture 700, with the difference being the location of opening 845. Light fixture 800 comprises heat sink 810 secured to casing 105. Heat sink 810, in turn, comprises housing 835 having a cavity (not visible in FIG. 11) with two or more lobes. The cavity can comprise end wall 885, and a trench 893 in end wall 885. Trench 893 faces opposite the direction of light emission 122, and can comprise a bottom 895 cooperating with side 897 to define trench 893. In light fixture 800, opening 845 is located in bottom 895. This is in contrast to opening 745 which is located in side 797 of trench 793 in light fixture 700.

While no wire connector is depicted as emerging from opening 845, opening 845 is also configured to allow passage of a wire connector for connecting the driver electronics receivable inside the cavity to a power source external to light fixture 800.

Figure 12:
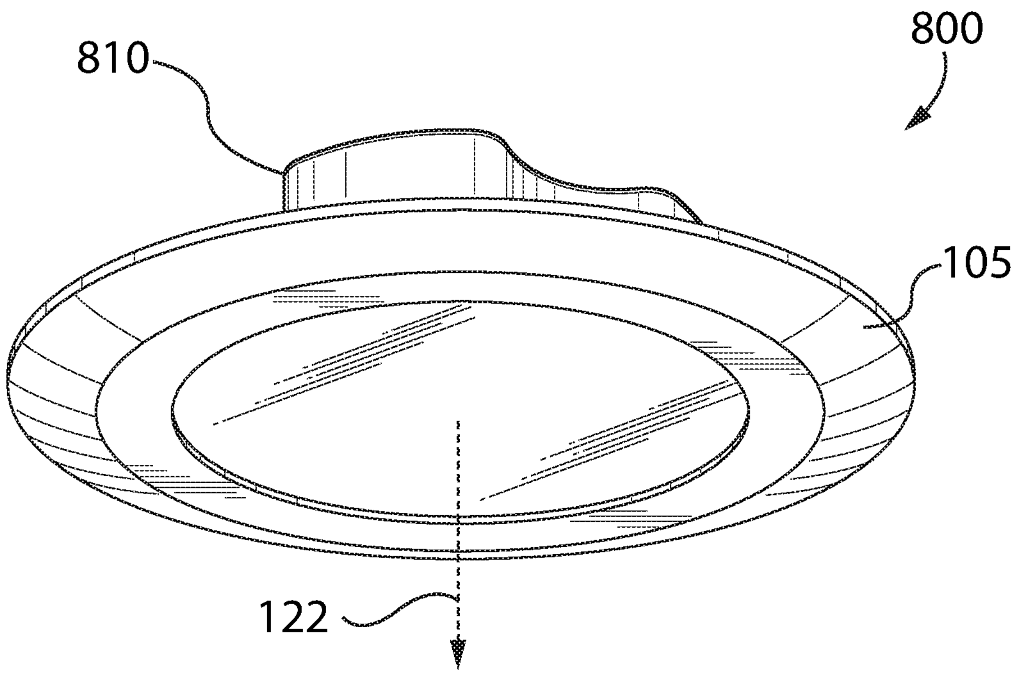
FIG. 12 shows a bottom perspective view of the light fixture of FIG. 11.

FIG. 12 shows a bottom perspective view of light fixture 800 comprising heat sink 810 secured to casing 105 and configured to emit light in the direction of light emission 122.

Figure 13:
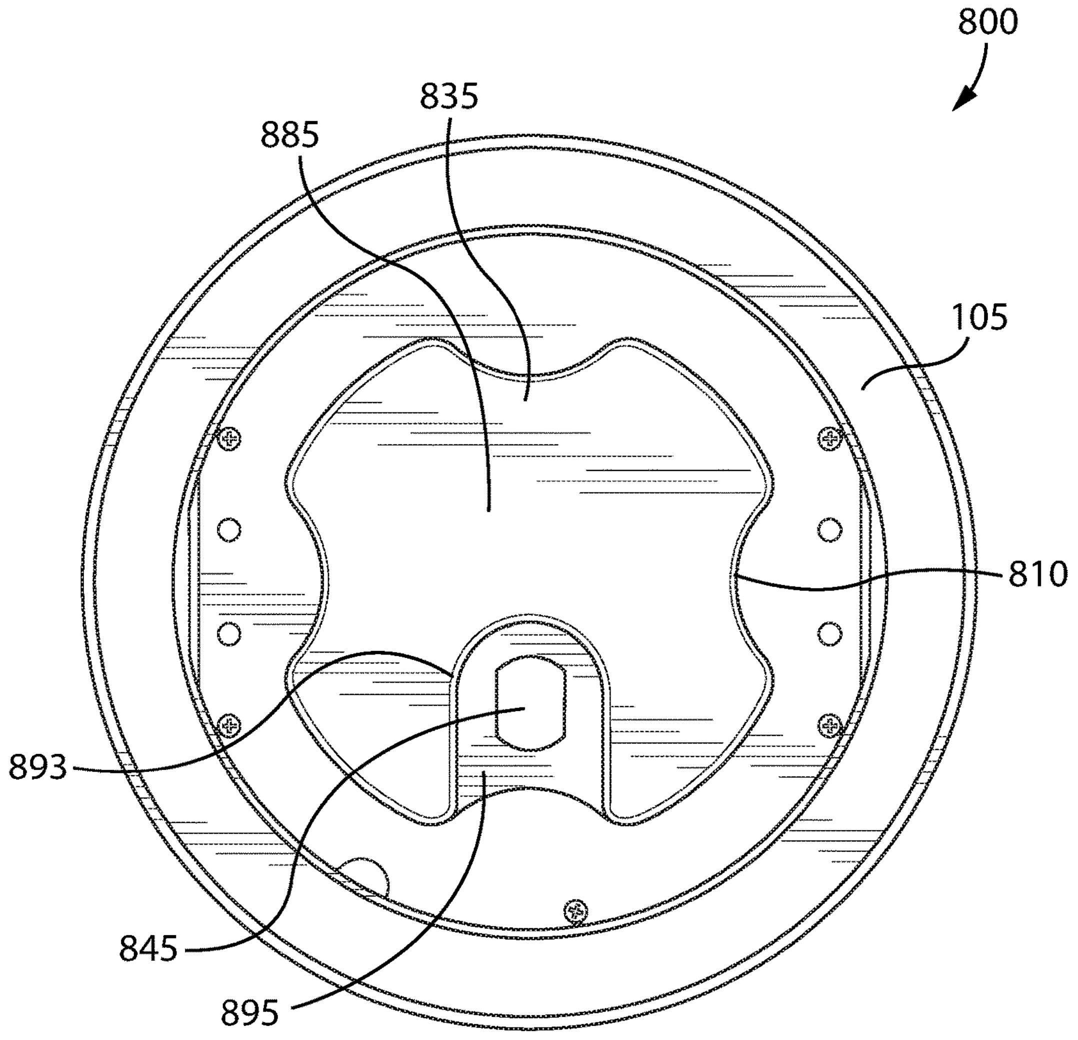
FIG. 13 shows a top plan view of the light fixture of FIG. 11.

FIG. 13 shows a top plan view of light fixture 800 comprising heat sink 810 secured to casing 105. Heat sink 810 comprises housing 835, which in turn comprises the cavity (not visible in FIG. 13). The cavity can comprise end wall 885, which in turn can comprise trench 893 having bottom 895. Opening 845 is located in bottom 895.

In some implementations, not shown, the opening in the cavity to allow passage of the wire connector can be in one of the one or more side walls of the cavity.

While in the foregoing housing 734 and the cavity are described separately, it is contemplated that housing 735 can be coextensive with the cavity.

Figure 14:
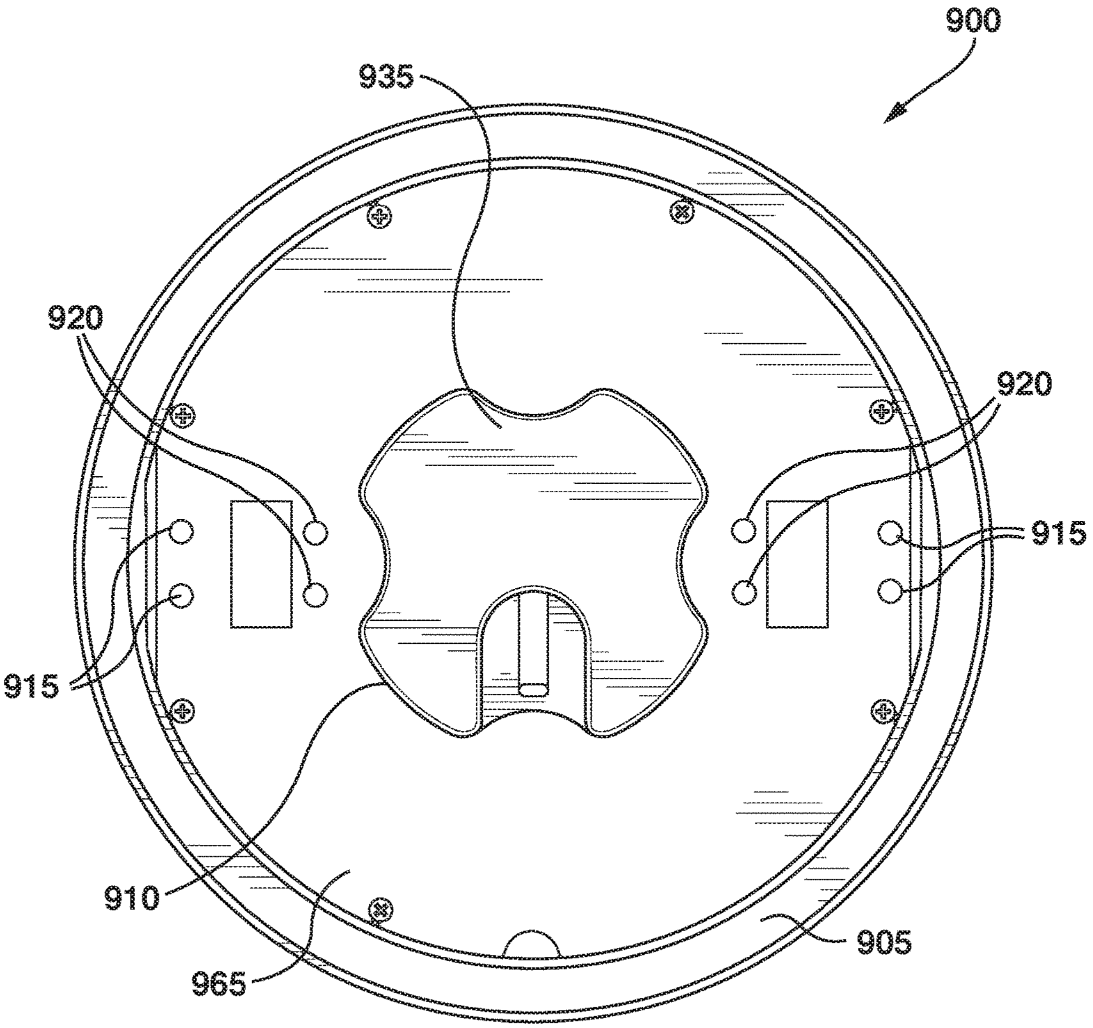
FIG. 14 shows a top plan view of yet another implementation of the light fixture, according to non-limiting implementations.

FIG. 14 shows a top plan view of a light fixture 900, comprising a casing 905 and a heat sink 910 secured to casing 905. Heat sink 910 comprises a housing 935 secured to a base 965. Light fixture 900 can be similar to light fixture 700 (shown in FIGS. 7-10), with a main difference being that the diameters of base 965 and casing 905 are larger than the corresponding diameters of base 765 and casing 105 of light fixture 700.

Light fixture 900 can comprise a clipping mechanism similar to clip supports 215 and clips 220 of light fixture 100, as shown in FIG. 3. Light fixture 900 can comprise two or more attachment sites for the clipping mechanism. For example, light fixture 900 can comprise two alternative sets of screw holes 915 and 920 for attaching the clipping mechanism to light fixture 900. This can allow the position of the clipping mechanism to be adjusted based on the size of the hole or opening that light fixture 900 is to be installed in.

For example, if light fixture 900 is to be installed in a larger diameter hole, the clipping mechanism can be attached to outer screw holes 915 to allow the clipping mechanism to grip the edges of the hole. On the other hand, if light fixture 900 is to be installed in a smaller hole, the clipping mechanism can be attached to inner screw holes 920 also to allow the clipping mechanism to grip the edges of the hole. Having multiple attachment sites for the clipping mechanism can allow the same light fixture 900 to be modified for installation in holes of different sizes, and can obviate the need for a different design and/or model of the light fixture for each different installation hole size.

Generally, housing the driver electronics in the heat sink can obviate the need for a separate driver unit for each LED light fixture. This in turn can reduce the number of separate devices that must be installed by a technician to implement a functional LED lighting installation, and thereby reduce the time, effort, and cost of installation.

In addition, by incorporating the driver electronics into each LED light fixture, the input power requirements can be harmonized across different sizes and types of LED light fixtures. For example, 2, 4, and 6 inch (diameter) LED light fixtures can be harmonized to accept 120V alternating current input power. This can, in turn, obviate the need for using a different external input power conditioning unit specific to each size and/or type of LED light fixture. This can also reduce the cost and complexity of implementing a functional LED lighting installation.

Moreover, housing the driver electronics in the heat sink can provide the driver electronics with heat dissipation and protection from the external elements. For example, the encapsulant can cover some portions of the driver electronics and at least partially protect the driver electronics from dust and moisture. The encapsulant can also promote heat transfer between the driver electronics and the heat sink, thereby enhancing heat dissipation from the driver electronics. The use of encapsulant can also simplify and speed up the manufacturing process, whereby the driver electronics are placed in the housing and some encapsulant, in its liquid, paste, or resinous state, is then injected into the housing. As the encapsulant sets, hardens, and/or polymerizes, it can secure the driver electronics in the housing.

Incorporating the driver electronics into the light fixture can also reduce the overall volume of the LED lighting components that are needed to be installed in the confined spaces where recessed lighting fixtures are often installed. For example, incorporating the driver electronics into the heat sink of the light fixture can produce a light fixture with sufficient heat dissipation but minimal height, i.e. the dimension of the light fixture in the direction of light emission, which can facilitate the installation of the light fixture in confined spaces.

The above-described implementations of the invention are intended to be examples of the present invention and alterations and modifications may be effected thereto, by those of skill in the art. The scope of the claims should not be limited by the exemplified implementations described above, but should be given the broadest interpretation consistent with the description as a whole.

The invention claimed is:

1. A heat sink for a light emitting diode light fixture, the heat sink comprising:
- a housing configured to receive driver electronics for powering one or more light emitting diodes of the light fixture, the housing comprising a cavity having an open end facing a direction of light emission and a closed end opposite the open end, the cavity shaped to receive the driver electronics when the heat sink is connected to the light fixture; and
- a heat exchanging portion thermally coupled to the housing, the heat exchanging portion comprising a base defining a plane about perpendicular to the direction of light emission, a height of the heat exchanging portion extending from the base in a direction opposite the direction of light emission being about equal to a depth of the cavity in the direction opposite the direction of light emission, the heat exchanging portion configured to
  - absorb heat from at least one of the one or more light emitting diodes and the driver electronics, conduct the heat to extremities of the heat exchanging portion, and dissipate the heat to an environment external to the light fixture.

2. The heat sink of claim 1, wherein the cavity is shaped as a circular puck having a flat face facing the direction of light emission and a cylindrical face cooperating with the flat face to define the cavity.

3. The heat sink of claim 1, wherein the housing is integrally formed with the heat exchanging portion.

4. The heat sink of claim 1, wherein the heat exchanging portion further comprises a plurality of fins extending from the base and thermally coupled to the base.

5. The heat sink of claim 4, wherein some fins of the plurality of fins are directly thermally coupled to the housing and others of the plurality of fins are only thermally coupled to the housing through the base.

6. The heat sink of claim 4, wherein a height of the plurality of fins extending from the base in a direction opposite the direction of light emission is about equal to a depth of the cavity in the direction opposite the direction of light emission.

7. A light fixture comprising:
- a casing;
- one or more light emitting diodes connected to the casing;
- driver electronics electrically connected to the one or more light emitting diodes;
- a heat sink secured to the casing, the heat sink comprising:
  - a housing configured to receive the driver electronics for powering the one or more light emitting diodes of the light fixture, the housing comprising a cavity having an open end facing a direction of light emission and a closed end opposite the open end, the cavity shaped to receive the driver electronics; and
  - a heat exchanging portion thermally coupled to the housing, the heat exchanging portion comprising a base defining a plane about perpendicular to the direction of light emission, a height of the heat exchanging portion extending from the base in a direction opposite the direction of light being about equal to a depth of the cavity in the direction opposite the direction of light emission, the heat exchanging portion configured to
    - absorb heat from at least one of the one or more light emitting diodes and the driver electronics, conduct the heat to extremities of the heat exchanging portion, and dissipate the heat to an environment external to the light fixture; and
- an encapsulant received within the housing, the encapsulant covering at least some portions of the driver electronics.

8. The light fixture of claim 7, wherein the housing is integrally formed with the heat exchanging portion.

9. The light fixture of claim 7, wherein the cavity is shaped as a circular puck having a flat face facing the direction of light emission and a cylindrical face cooperating with the flat face to define the cavity.

10. The light fixture of claim 7, wherein the heat exchanging portion further comprises a plurality of fins extending from the base and thermally coupled to the base.

11. The light fixture of claim 10, wherein some fins of the plurality of fins are directly thermally coupled to the housing and others of the plurality of fins are only thermally coupled to the housing through the base.

12. The light fixture of claim 10, wherein a height of the plurality of fins extending from the base in a direction opposite the direction of light emission is about equal to a depth of the cavity in the direction opposite the direction of light emission.

13. The light fixture of claim 7, wherein the encapsulant covers at least some portions of the driver electronics, the covering conformal to the driver electronics, and the encapsulant fills at least a portion of the cavity, the filling conformal to the cavity.

14. A heat sink for a light emitting diode light fixture, the heat sink comprising:
- a housing configured to receive driver electronics for powering one or more light emitting diodes of the light fixture, the housing comprising a cavity comprising three or more hollow lobes, the cavity shaped to receive the driver electronics when the heat sink is connected to the light fixture; and an opening in the cavity, the opening configured to allow passage of a wire connector for connecting the driver electronics receivable inside the cavity to a power source external to the light fixture;

wherein the cavity is shaped as a lobed puck comprising:

an end wall having a perimeter defining three or more extensions, the end wall facing a direction of light emission; and one or more side walls cooperating with the end wall to define the cavity;

wherein each of the extensions cooperates with the one or more side walls to define one corresponding lobe.

15. The heat sink of claim 14, wherein the perimeter defines four identical extensions oriented radially, each extension being equidistant from its two adjacent extensions.

16. The heat sink of claim 14, wherein the opening is located in one of the one or more side walls.

17. The heat sink of claim 14, wherein the end wall comprises a trench facing opposite the direction of light emission, the trench configured to receive a portion of a length of the wire connector.

18. The heat sink of claim 17, wherein the trench comprises a bottom cooperating with one or more sides to define the trench, and the opening is located in one of the one or more sides.

19. The heat sink of claim 17, wherein the trench comprises a bottom cooperating with one or more sides to define the trench, and the opening is located in the bottom.

* * * * *